(12) United States Patent
Nishimura et al.

(10) Patent No.: US 8,139,167 B2
(45) Date of Patent: Mar. 20, 2012

(54) PROJECTION DISPLAY APPARATUS WHICH ENABLES A SELECTED IMAGE INVERTING PROCESS TO BE PERFORMED TO FACILITATE REGISTRATION ADJUSTMENT

(75) Inventors: Koichiro Nishimura, Kanagawa (JP); Yoshitake Kondo, Kanagawa (JP)

(73) Assignee: Sony Corporation (JP)

( * ) Notice: Subject to any disclaimer, the term of this patent is extended or adjusted under 35 U.S.C. 154(b) by 899 days.

(21) Appl. No.: 12/220,299

(22) Filed: Jul. 23, 2008

(65) Prior Publication Data

US 2009/0027569 A1    Jan. 29, 2009

(30) Foreign Application Priority Data

Jul. 25, 2007   (JP) ................. P2007-193789

(51) Int. Cl.
*H04N 3/22*   (2006.01)
*G03B 21/14*  (2006.01)

(52) U.S. Cl. ......................... 348/745; 353/69

(58) Field of Classification Search ............. 348/745, 348/655, 744, 758, 759, 761, 179, 649, 678, 348/766, 776; 353/69, 30; 345/589, 88; 358/518
See application file for complete search history.

(56) References Cited

U.S. PATENT DOCUMENTS

| 5,488,492 | A  | * | 1/1996 | Abe ........................ 358/518 |
| 6,048,067 | A  | * | 4/2000 | Yamada .................... 353/30 |
| 7,658,498 | B2 | * | 2/2010 | Anson ..................... 353/69 |
| 2004/0233213 | A1 | * | 11/2004 | Ohsawa ................. 345/589 |
| 2004/0246217 | A1 | * | 12/2004 | Hirakawa et al. ........ 345/88 |
| 2006/0268233 | A1 | * | 11/2006 | Sato ...................... 353/13 |

FOREIGN PATENT DOCUMENTS

| JP | 5-014843 A | 1/1993 |
| JP | 08-201937 A | 8/1996 |
| JP | 2000-209575 A | 7/2000 |
| JP | 2003-295310 A | 10/2003 |

* cited by examiner

*Primary Examiner* — Victor Kostak
(74) *Attorney, Agent, or Firm* — Lerner, David, Littenberg, Krumholz & Mentlik, LLP

(57) ABSTRACT

The present invention provides a projection display apparatus realizing improved operability at the time of registration adjustment irrespective of a use situation of the apparatus. In the case where misregistration occurs between primary color lights, video signals for three colors are corrected (registration adjustment is performed) so as to reduce the misregistration in accordance with an input adjustment value. An image inverting process is performed on an input video signal so that the image is inverted in a display screen. By a configuration by the user, the image is properly inverted in the display screen. When the image inverting process is performed, an adjustment value, with a sign different from that in the misregistration direction in a coordinate system where the image is not inverted, is input by an operation on the display screen.

3 Claims, 16 Drawing Sheets

FIG. 11A
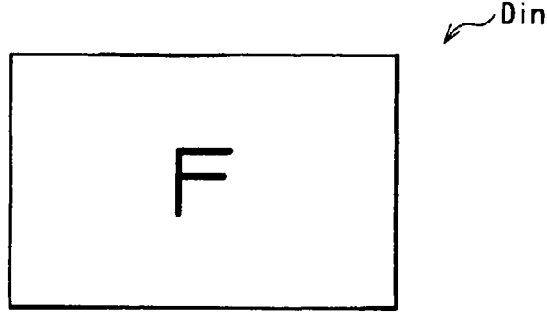
FIG. 11B
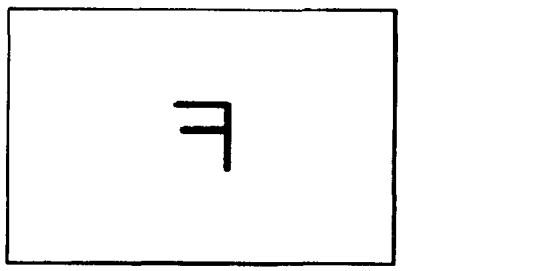
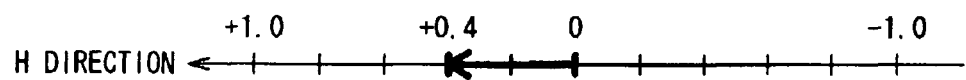
FIG. 12
RELATED ART

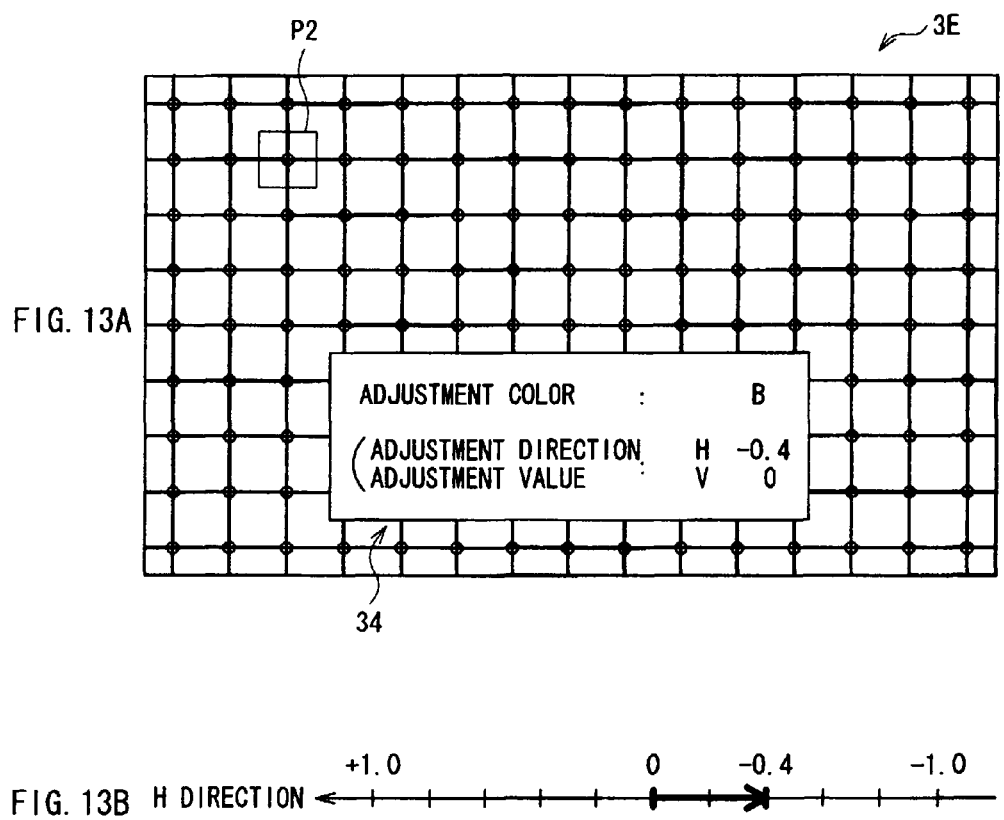
FIG. 13A
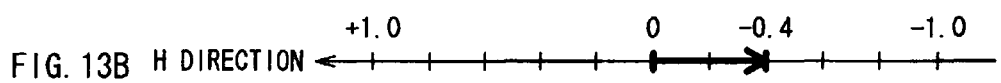
FIG. 13B H DIRECTION

PROJECTION DISPLAY APPARATUS WHICH ENABLES A SELECTED IMAGE INVERTING PROCESS TO BE PERFORMED TO FACILITATE REGISTRATION ADJUSTMENT

CROSS REFERENCE TO RELATED APPLICATIONS

The present application claims priority from Japanese Patent Application No. JP 2007-193789, filed in the Japanese Patent Office on Jul. 25, 2007, the entire content of which is incorporated herein by reference.

BACKGROUND OF THE INVENTION

1. Field of the Invention

The present invention relates to a projection display apparatus applied to a liquid crystal projector and the like.

2. Description of the Related Art

A projection display apparatus (for example, a liquid crystal projector) is being spread, which displays a picture by spatially modulating incident light on a spatial light modulation device in accordance with an electric signal applied to the spatial light modulation device, outputting the modulated light, and collecting and projecting the outgoing light. Such a projection display apparatus has generally a lamp as a light source, a condenser, and an illumination optical system for condensing light emitted from the lamp and the condenser and making the condensed light enter the spatial light modulation device. Light from the spatial light modulation device is projected by a projection lens onto a screen or the like.

Among such projection display apparatuses, in an apparatus for combining three primary color light of red light (R), green light (G), and blue light (B) (so-called 3-chip projection display apparatus), variations may occur in the precision and the like in fixation of an optical system. In this case, there is an issue such that out-of-color-registration occurs due to misregistration between lights of primary colors in a display image projected on a screen. To reduce out-of-color-registration caused by optical-mechanism factors, a projection display apparatus having a registration adjusting function of electrically correcting the out-of-color-registration has been conventionally proposed (for example, Japanese Unexamined Patent Application Publication No. H08-201937).

SUMMARY OF THE INVENTION

In the projection display apparatus, for example, there is a case that the user sees a video image from the back side of a screen, or the apparatus is used in a state where it is attached to the ceiling or the like. In the case of using the apparatus in such a manner, a video image is inverted in the horizontal direction and/or the vertical direction (image inverting function) and the inverted video image is projected so that the user can see the video image in a normal direction.

Also in the case where the image inverting function is executed, the direction of out-of-color-registration caused by misregistration between the primary color lights is unchanged even after the image inversion is performed for the reason that the misregistration occurs in hardware. Therefore, if the user tries to perform the registration adjustment by an operation on a display screen, the adjustment direction seen from the user and the actual adjustment direction are opposite to each other in the horizontal direction and/or the vertical direction. An issue arises such that it is difficult for the user to perform the registration adjustment.

It is therefore desirable to provide a projection display apparatus realizing improved operability in registration adjustment irrespective of the use situation of the apparatus.

According to an embodiment of the present invention, there is provided a projection display apparatus including: a light source; a spatial light modulation device modulating, on the basis of a video signal, each of primary color lights for color display emitted from the light source; projecting means for projecting, onto a screen, each of the primary color lights modulated by the spatial light modulation device; signal processing means; and correcting means. The signal processing means performs, in accordance with an operation from a user, an image inverting process on the video signals so that an image projected on the screen is inverted in at least one of a horizontal direction and a vertical direction on the screen. The correcting means corrects, based on a correction value entered by an operation on the screen, the video signal for each of the primary color lights so as to reduce horizontal and/or vertical misregistration between the primary color light projected on the screen, and supplies the corrected video signal to the spatial light modulation device. When the image projected on the screen is inverted, the correction value with a sign is entered by an operation on the screen, the sign being different from that of misregistration direction under a coordinate system where the image is not inverted.

In the projection display apparatus according to the embodiment of the present invention, light emitted from the light source is modulated by the spatial light modulation device on the basis of a video signal for each of primary color lights. The primary color light modulated is projected onto a screen, thereby displaying a video image based on the video signal. The video signals for each of the primary color lights are corrected, base on a correction value entered by an operation on the screen, so as to reduce horizontal and/or vertical misregistration between the primary color lights projected on the screen. The corrected video signal is supplied to the spatial light modulation device. As a result, occurrence of out-of-color-registration due to the misregistration between the primary color lights is suppressed, and the display quality improves. An image inverting process on the video signals is performed, in accordance with an operation from a user, so that an image projected on the screen is inverted in at least one of a horizontal direction and a vertical direction. Therefore, proper image inversion is performed on the screen by an operation from the user according to a use situation of the apparatus. In the case where the image inverting process is performed, the correction value with a sign is entered by an operation on the screen, the sign being different from that of misregistration direction under a coordinate system where the image is not inverted. Therefore, even in a use situation such that the image inversion is performed on the display screen, the operation of inputting the correction value by the user is easy.

In the projection display apparatus of the embodiment of the present invention, the video signals for each of the primary color light are corrected (registration adjustment is performed), base on the correction value entered by an operation on the screen, so as to reduce horizontal and/or vertical misregistration between the primary color lights projected on the screen. Thus, occurrence of the out-of-color-registration caused by the misregistration between the primary color lights is suppressed, and display quality may be improved. Since the image inverting process is performed on the video signal so that the image projected on the screen is inverted in at least one of the horizontal and vertical directions on the screen, proper image inversion may be performed on the screen by the operation from the user according to the use situation of the apparatus. In the case where such an image inverting process is performed, the correction value with a sign is entered by an operation on the screen, the sign being different from that of misregistration direction under the coordinate system where the image is not inverted. Therefore, even in the use situation such that the image inversion is performed on the screen, the correction value inputting operation by the user may be facilitated. Thus, irrespective of the use situation of the apparatus, the operability in the registration adjustment may be improved.

Other and further objects, features and advantages of the invention will appear more fully from the following description.

BRIEF DESCRIPTION OF THE DRAWINGS

FIGS. 11A and 11B are diagrams for explaining the image inversion in the case of FIG. 9.

FIG. 12 is a diagram showing a comparative example of thinking of adjustment in the case of FIG. 9.

FIG. 13A is a diagram showing an example of the display screen at the time of registration adjustment in the embodiment in the case of FIG. 9, and FIG. 13B is a diagram showing an example of thinking of adjustment.

DETAILED DESCRIPTION OF THE PREFERRED EMBODIMENTS

An embodiment of the present invention will be described in detail hereinbelow with reference to the drawings.

Figure 1:
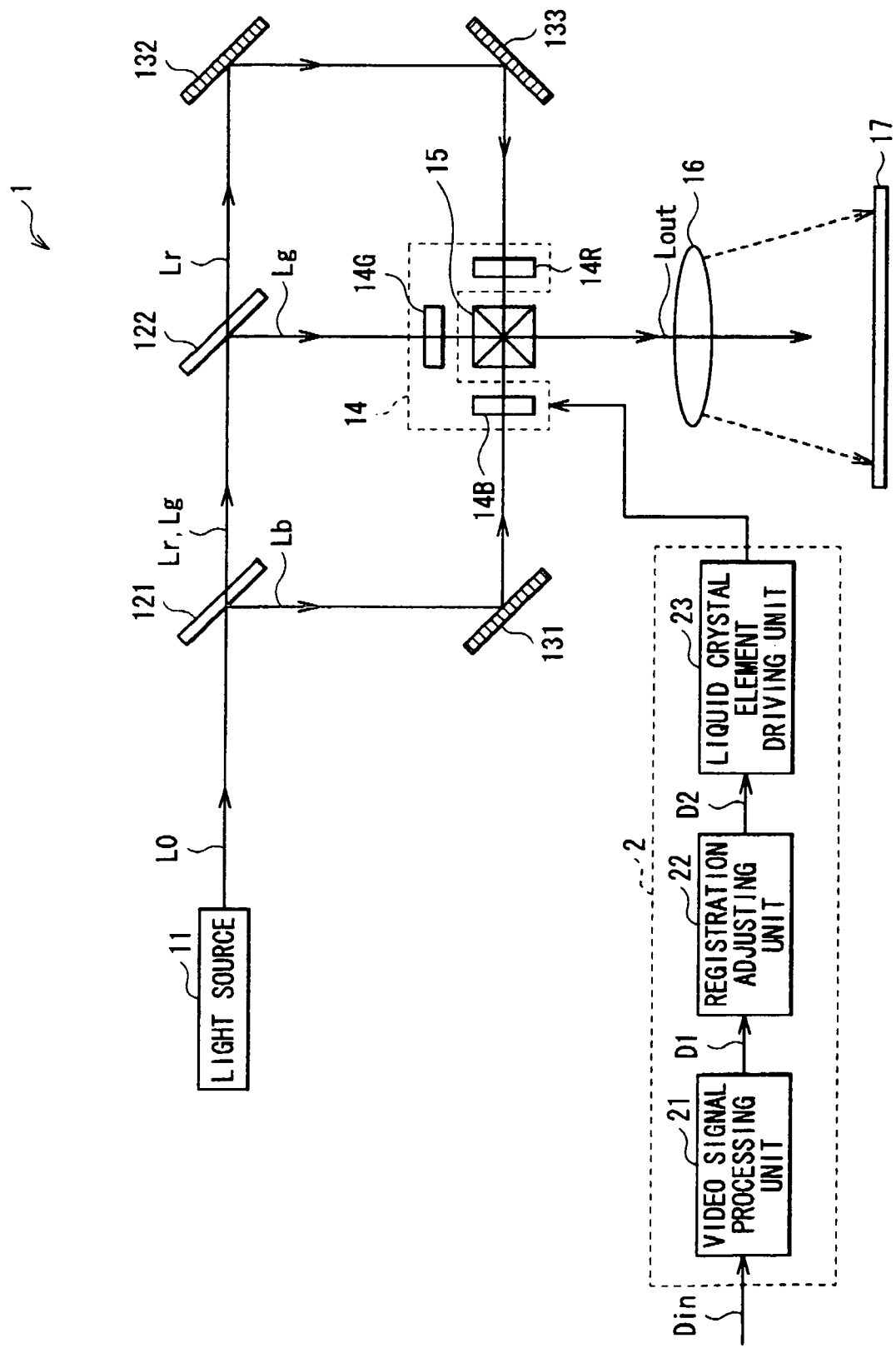
FIG. 1 is a block diagram showing the configuration of a projection display apparatus as an embodiment of the present invention.

FIG. 1 shows a general configuration of a projection display apparatus (liquid crystal projector 1) as an embodiment of the present invention. The liquid crystal projector 1 displays a video image on the basis of an input video signal Din supplied from the outside. The liquid crystal projector 1 includes a light source 11, dichroic mirrors 121 and 122, reflection mirrors 131, 132, and 133, a light modulator 14, a dichroic prism 15, a projection lens 16, a screen 17, and a control unit 2 for controlling the light modulator 14 on the basis of the input video signal Din.

The light source 11 generates white light including primary color light of red light (R), blue light (B), and green light (G) which is necessary to display a color image. The light source 11 is configured by, for example, a halogen lamp, a metal halide lamp, a xenon lamp, or the like.

The dichroic mirror 121 transmits the red light Lr and the green light Lg in the irradiation light L0 generated from the light source 11 and reflects the blue light Lb, so that the red light Lr and the green light Lg travels while being separated from the blue light Lb. The dichroic mirror 122 transmits the red light Lr out of the red light Lr and the green light Lg passed through the dichroic mirror 121 and reflects the green light Lg, thereby making the red light Lr and the green light Lg travel while being separated from each other. The green light Lg reflected by the dichroic mirror 122 travels toward the light modulator 14.

The reflection mirror 131 reflects the blue light Lb reflected by the dichroic mirror 121 toward the light modulator 14. The reflection mirrors 132 and 133 reflect the red light Lr reflected by the dichroic mirror 122 toward the light modulator 14.

The light modulator 14 includes three liquid crystal elements 14R, 14G, and 14B corresponding to the primary color light of the red light Lr, the green light Lg, and the blue light Lb, respectively. The light modulator 14 modulates the irradiation light L0 emitted from the light source 11 for each of the primary color lights (red light Lr, green light Lg, and blue light Lb) on the basis of video signals for the colors supplied from the control unit 2.

Concretely, the liquid crystal element 14R is disposed between the reflection mirror 133 and the dichroic prism 15 and modulates the incident red light Lr on the basis of the video signal for red supplied from the control unit 2. The liquid crystal element 14G is disposed between the dichroic mirror 122 and the dichroic prism 15 and modulates the incident green light Lg on the basis of the video signal for green supplied from the control unit 2. The liquid crystal element 14B is disposed between the reflection mirror 131 and the dichroic prism 15 and modulates the incident blue light Lb on the basis of the video signal for blue supplied from the control unit 2. Each of the liquid crystal elements 14R, 14G, and 14B has a structure in which, for example, a liquid crystal layer including liquid crystal molecules is sandwiched between a pair of substrates to which a drive voltage based on a video signal is applied.

The dichroic prism 15 mixes the red light Lr, green light Lg, and blue light Lb modulated by the liquid crystal elements 14R, 14G, and 14B, thereby obtaining mixture light (display light) Lout and makes the display light Lout travel along a single optical path (an optical path leading to the projection lens 16).

The projection lens 16 is disposed between the dichroic prism 15 and the screen 17 and projects the display light Lout generated by the dichroic prism 15 onto the screen 17. The screen 17 is a section to which light (display light Lout) modulated by the liquid crystal elements 14R, 14G, and 14B and projected by the projection lens 16 is projected.

The control unit 2 has a video signal processing unit 21, a registration adjusting unit 22, and a liquid crystal element driving unit 23.

The video signal processing unit 21 has the function of generating a video signal D1 (before-adjustment data D1) by performing white balance adjustment for adjusting color temperature of the input video signal Din and so-called gamma correction on the input video signal Din. By the function, adjustment to improve the quality of a display image is carried out. The video signal processing unit 21 also has the function of performing an image inverting process (image inverting function) on the input video signal Din so that image inversion is performed in at least one of the horizontal direction (H direction) and the vertical direction (V direction) in a display plane of the screen 17 in accordance with an operation from the user. The details of the image inverting process performed by the video signal processing unit 21 will be described later.

When misregistration occurs between the primary color lights Lr, Lg, and Lb projected onto the screen 17, the registration adjusting unit 22 corrects the video signal D1 (before-adjustment data D1) for each of the colors corresponding to the primary color lights Lr, Lg, and Lb so as to reduce such misregistration in accordance with an adjustment value (correction value) entered by an operation on the screen by the user (registration adjustment). The registration adjusting unit 22 supplies the adjusted video signal D2 (adjusted data D2) for each of the colors to the liquid crystal element driving unit 23. The details of the adjusting process performed by the registration adjusting unit 22 will be described later.

The liquid crystal element driving unit 23 drives each of the liquid crystal elements 14R, 14B, and 14G on the basis of the adjusted data D2 supplied from the registration adjusting unit 22.

Each of the liquid crystal elements 14R, 14B, and 14G corresponds to a concrete example of "spatial light modulation device" in the present invention, and the projection lens 16 corresponds to a concrete example of "projecting means" in the present invention. The video signal processing unit 21 corresponds to a concrete example of "signal processing means" in the present invention. The registration adjusting unit 22 corresponds to a concrete example of "correcting means" in the present invention.

Figure 2:
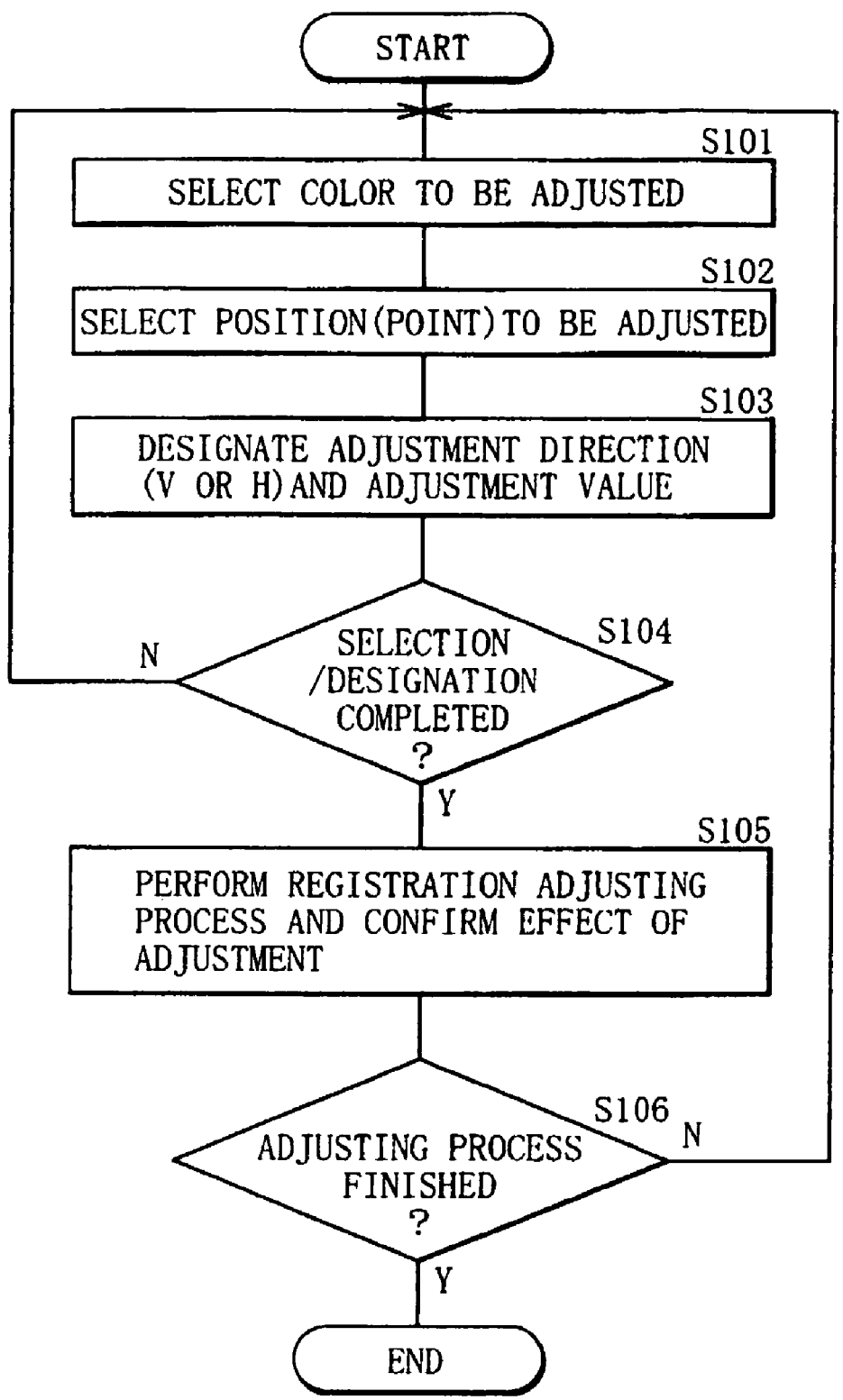
FIG. 2 is a flowchart showing an example of an adjusting process performed by a registration adjusting unit.
Figure 3:
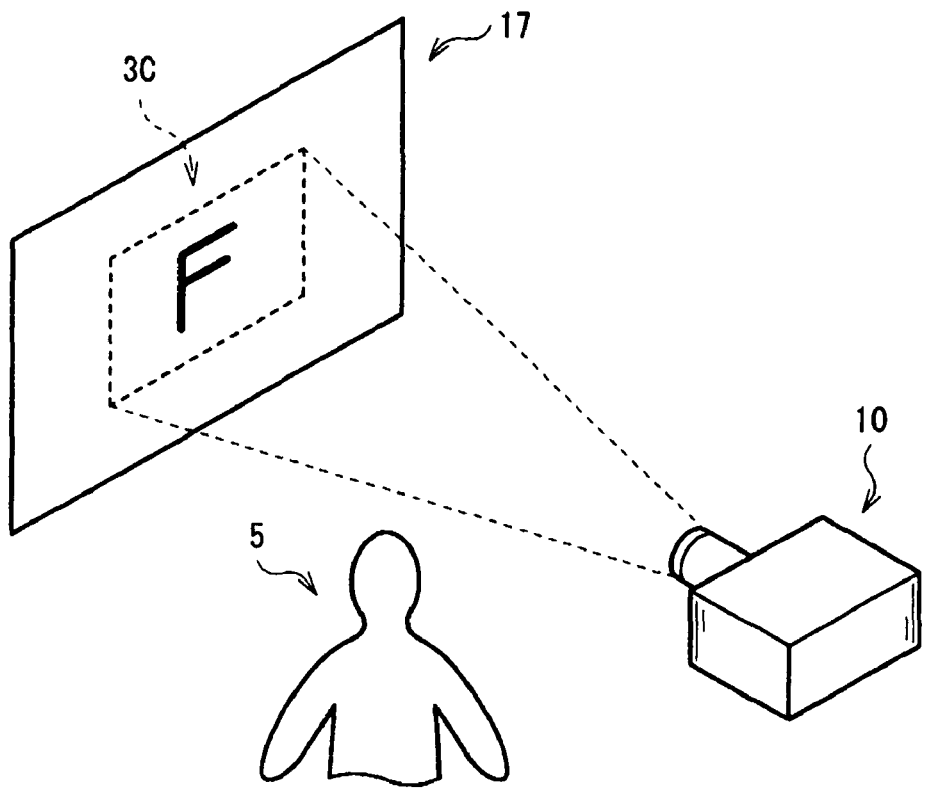
FIG. 3 is a perspective view showing an example of use of the projection display apparatus in the case where image inversion in the horizontal and vertical directions is unnecessary.
Figure 8:
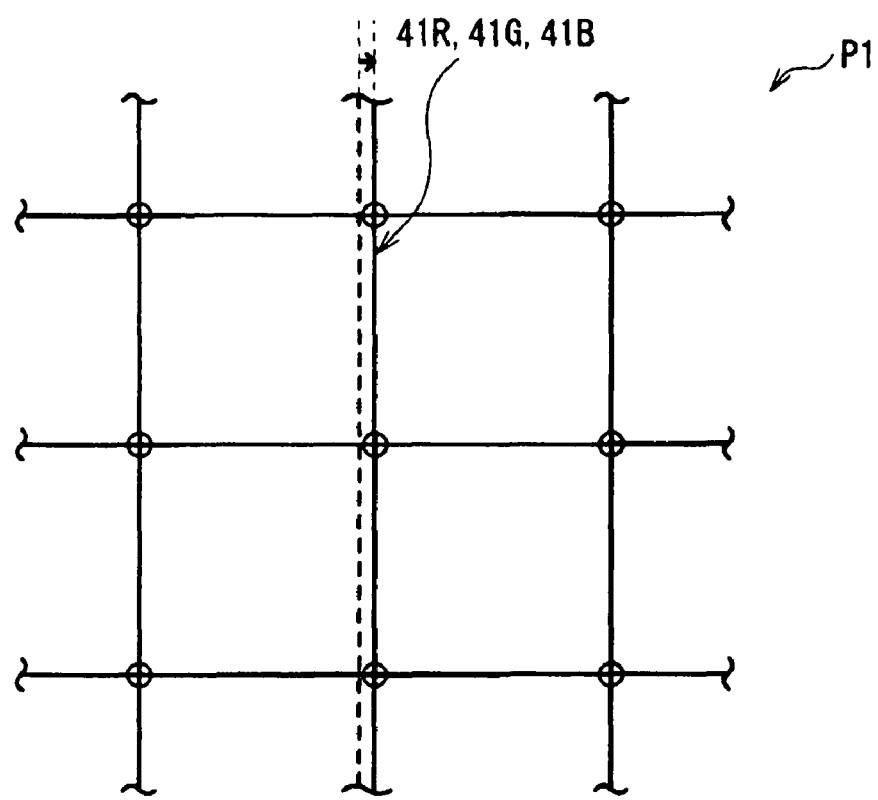
FIG. 8 is an enlarged diagram of the display screen after the registration adjustment is performed in the example of the display screen shown in FIG. 6.
Figure 9:
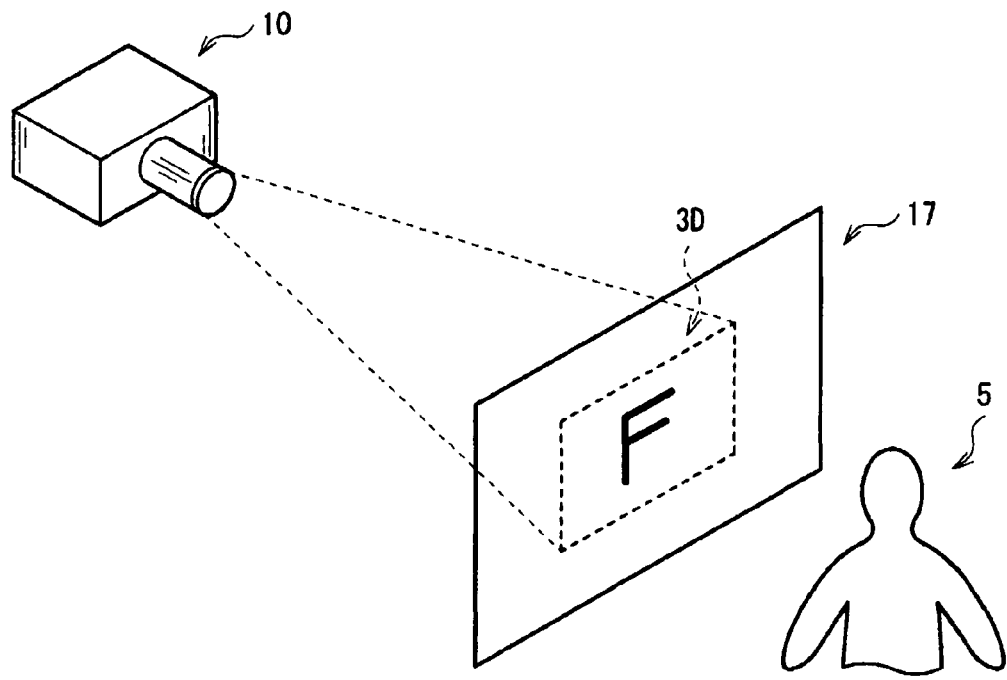
FIG. 9 is a perspective view showing an example of use of the projection display apparatus in the case where the image inversion in the horizontal direction is necessary.

Referring now to FIG. 1 to FIGS. 13A and 13B, the operation of the liquid crystal projector 1 of the embodiment will be described in detail. FIG. 2 is a flowchart showing an example of the adjusting process performed by the registration adjusting unit 22. FIG. 3 shows an example of use of the liquid crystal projector 1 in the case where image inversion in the horizontal and vertical directions is unnecessary. FIGS. 4 to 8 show an example of an image inverting process and a registration adjusting process in the example of use as shown in FIG. 3. FIG. 9 shows an example of use of the liquid crystal projector 1 in the case where the image inversion in the horizontal direction is necessary. FIG. 10 to FIGS. 13A and 13B show an example of an image inverting process and a registration adjusting process in an example of use as shown in FIG. 9 in comparison with a comparative example (FIG. 12).

In the liquid crystal projector 1, as shown in FIG. 1, the irradiation light L0 emitted from the light source 11 is split by the dichroic mirror 121 to the red light Lr and the green light Lg, and the blue light Lb. The red light Lr and the green light Lg is separated from each other by the dichroic mirror 122. The split red light Lr enters the liquid crystal element 14R via the reflection mirrors 132 and 133, the split green light Lg directly enters the liquid crystal element 14G, and the split blue light Lb enters the liquid crystal element 14B via the reflection mirror 131. The primary color lights Lr, Lg, and Lb are modulated on the basis of the video signals for the colors supplied from the control unit 2 in the liquid crystal elements 14R, 14G, and 14B, respectively. The modulated primary color lights Lr, Lg, and Lb are mixed with each other by the dichroic prism 15 and becomes the display light Lout. The display light Lout is projected by the projection lens 16 onto the screen 17, and a video image is displayed on the basis of the input video signal Din.

In the control unit 2, first, white balance adjustment and gamma correction is performed on the input video signal Din in the video signal processing unit 21, thereby generating the video signal D1. In the registration adjusting unit 22, for example, as shown in FIG. 2, correction (registration adjustment) is performed on the video signal D1 (before-adjustment data D1) supplied from the video signal processing unit 21 in accordance with a correction value entered from the user. The corrected video signal D2 (adjusted data D2) is supplied to the liquid crystal element driving unit 23.

Figure 4:
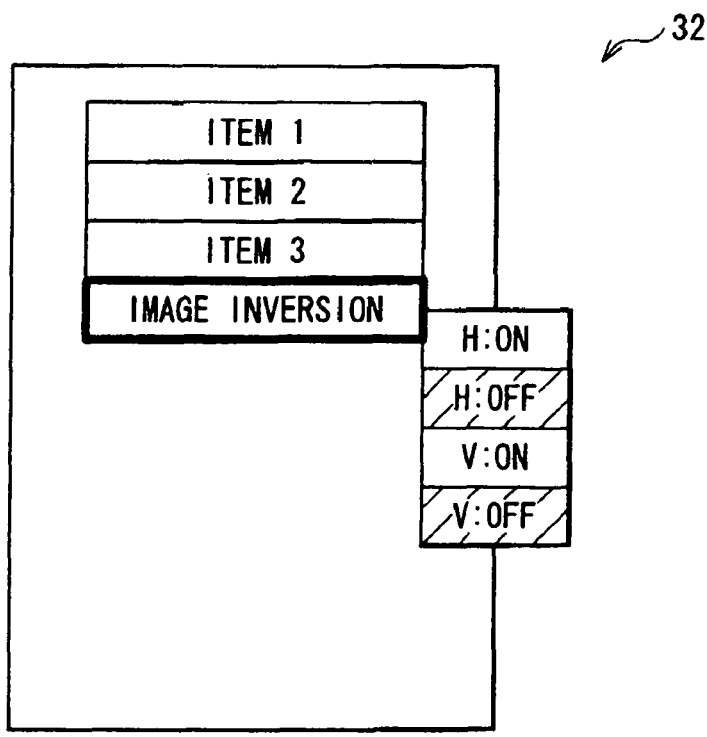
FIG. 4 is diagram showing an example of setting of an image inverting function in the case of FIG. 3.
Figure 5:
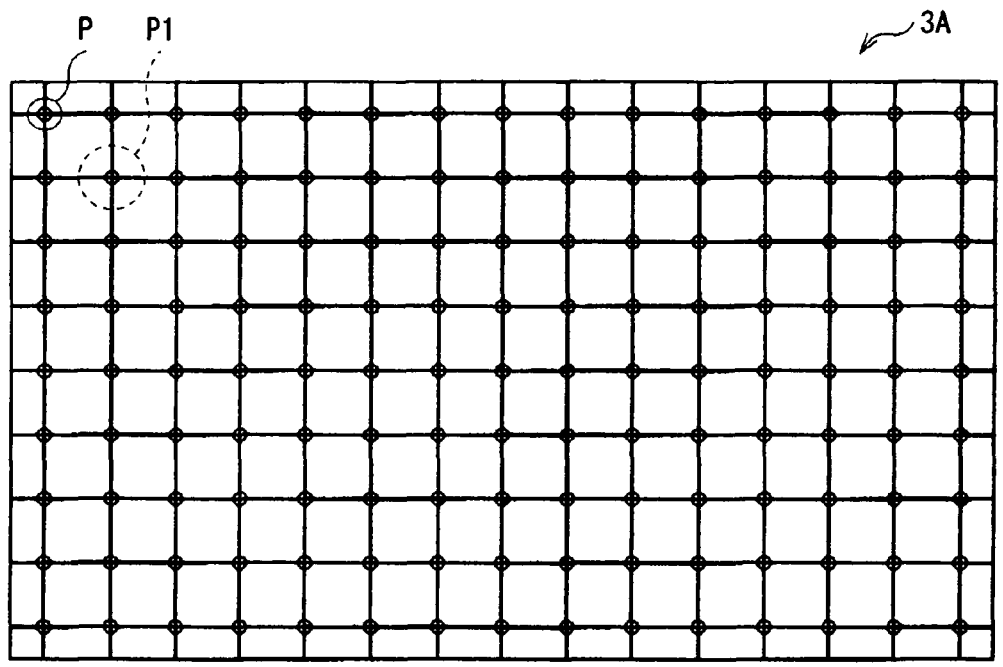
FIG. 5 is a diagram showing an example of a display screen before the registration adjustment is performed.
Figure 6:
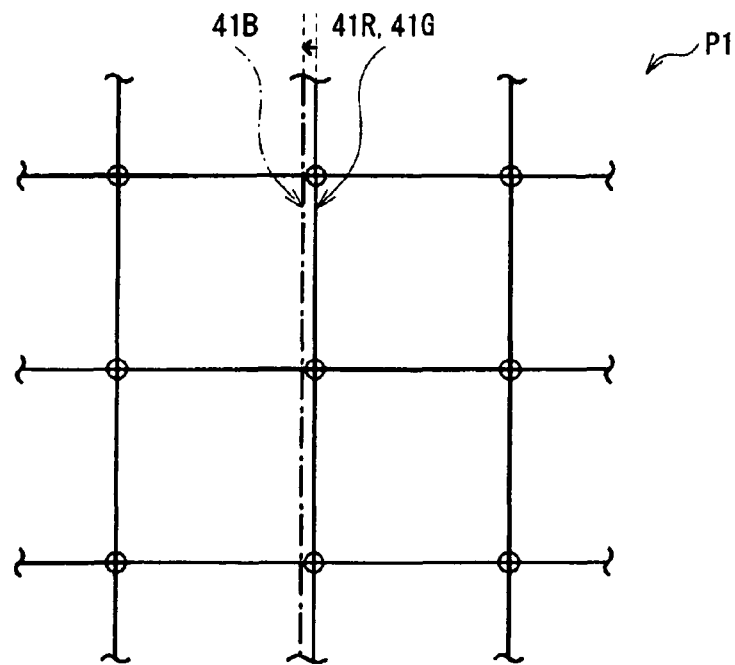
FIG. 6 is an enlarged diagram showing an example of the display screen in the case where misregistration in the horizontal direction occurs in specific primary color light.

For example, as shown in FIG. 3, in a use situation such that a user 5 sees an image (display screen 3C) projected from a projector body 10 onto the screen 17 from the same side as the projector body 10, the user 5 is able to see the video image in the same direction. Since the user 5 can see the image in the normal direction without performing any process, it is unnecessary to perform the image inverting process by the video signal processing unit 21. Therefore, in such a use situation, the user 5 performs an operation of turning "off" the image inverting function in the horizontal direction (H direction) and the vertical direction (v direction) in the adjustment menu 32 on the display screen 3C as shown in FIG. 4, and registration adjustment is performed as will be described below. Concretely, for example, in the case where a plurality of adjustment points P for registration adjustment are displayed like the display screen 3A shown in FIG. 5 and out-of-color-registration as shown in FIG. 6 occurs around a reference numeral P1 in the diagram, registration adjustment is performed as follows. The out-of-color-registration is caused by misregistration of a blue light line 41B as one of a red light line 41R, a green light line 41G, and the blue light line 41B only by, for example, "−0.4 point" in the horizontal direction (H direction) (0.4 point to the left)).

Figure 7A:
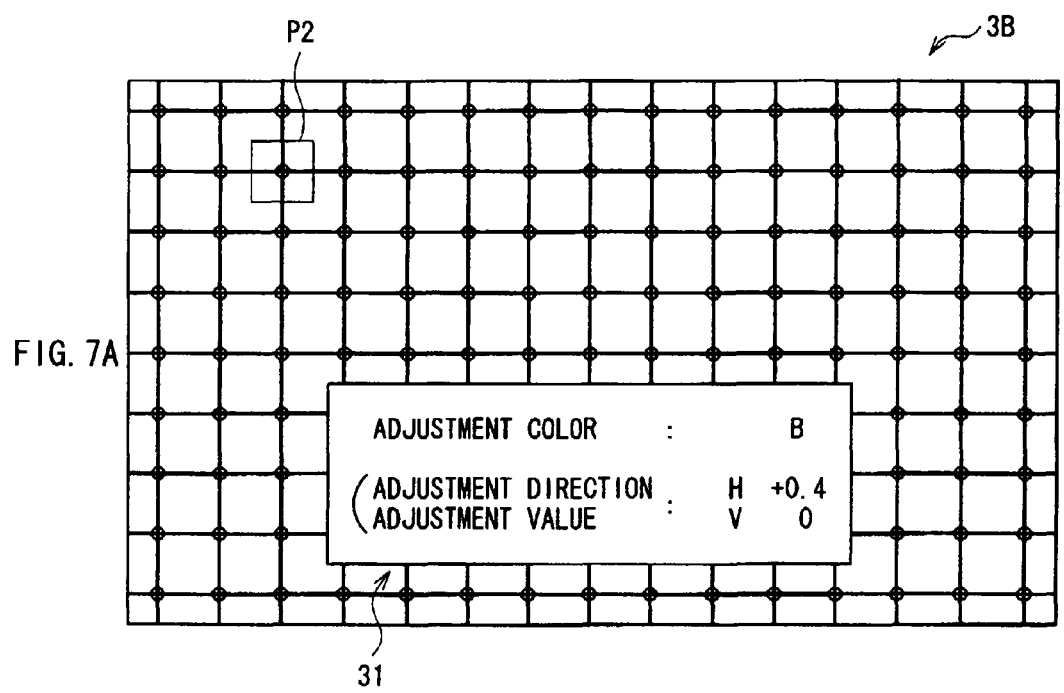
FIG. 7A is a diagram showing an example of the display screen at the time of registration adjustment in the horizontal direction.

Specifically, first, a color to be adjusted (in this case, blue (B)) is selected by the user (step S101 in FIG. 2) on an adjustment menu 31 on a display screen 3B as shown in FIG. 7A. A position (point) to be adjusted is selected similarly on the display screen 3B (in this case, an adjustment point near the reference numeral P1 is selected as a selected point P2) (step S102). An adjustment direction (either the horizontal direction (H direction) or the vertical direction (V direction), in this case, the horizontal direction) and an adjustment value (in this case, "+0.4" point (0.4 point to the right)) are set by the user on the adjustment menu 31 (step S103). The registration adjusting unit 22 determines whether such selecting/designating process has been completed or not (step S104). In the case where the user replies that the process has not been completed (N in step S104), the program returns to the step S101 and repeats the selecting/designating process in the steps S101 to S103. On the other hand, when the user replies that the process has been completed (Y in step S104), an actual registration adjusting process is performed on the basis of the selected/designated data, and an adjustment effect recognizing process on the display screen is performed by the user (step S105). Whether the entire adjusting process is finished or not is determined by the registration adjusting unit 22 (step S106). In the case where the user instructs not to finish the entire adjusting process yet (N in step S106), the program returns to the step S101 and repeats the processes in the steps S101 to S105. On the other hand, for example, as shown in FIG. 8, in the case where the out-of-color-registration caused by the misregistration in the horizontal direction of the blue light line 41B is reduced (eliminated), an instruction of finishing the entire adjusting process is given by the user (Y in step S106), and the entire adjusting process is finished.

Figure 7B:
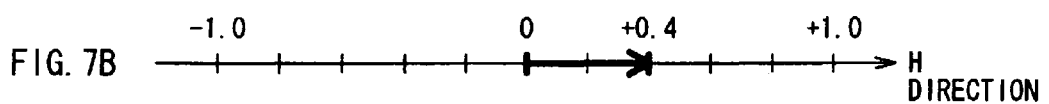
FIG. 7B is a diagram showing an example of thinking of adjustment.

In the registration adjustment in the horizontal direction (H direction) in the case where the image inverting process is unnecessary, it is considered that the user 5 performs the adjustment on the basis of thinking as shown in FIG. 7B. Since an adjustment direction seen from the user on the display screen 3C and an actual adjustment direction in the apparatus coincide with each other in the horizontal direction, an operation in the registration adjustment is easy.

As described above, in the registration adjusting unit 22, in the case where the misregistration occurs between the primary color lights Lr, Lg, and Lb projected on the screen 17, the video signals D1 for the colors corresponding to the primary color lights Lr, Lg, and Lb are corrected (registration adjustment is performed) so as to reduce the misregistration in accordance with the adjustment value or the like entered by the user. The corrected video signals D2 are supplied to the liquid crystal elements 14R, 14G, and 14B. As a result, occurrence of the out-of-color-registration caused by the misregistration between the primary color lights Lr, Lg, and Lb is suppressed, and display quality improves.

Figure 10:
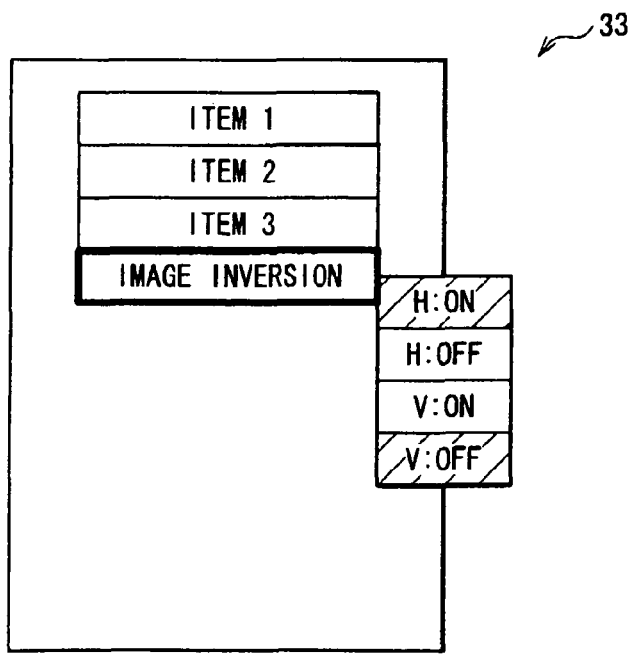
FIG. 10 is a diagram showing an example of setting of the image inverting function in the case of FIG. 9.

On the other hand, for example, in a use situation that the user 5 sees a video image (display screen 3D) projected from the projector body 10 onto the screen 17 from the side opposite to the projector body 10 with respect to the screen 17 as shown in FIG. 9, without any process, the user 5 may not see the video image in the normal direction (the video image is inverted in the horizontal direction). Consequently, the image inverting process in the horizontal direction has to be performed by the video signal processing unit 21. Therefore, in such a use situation, for example, the user 5 performs an operation of turning "on" the image inverting function in the horizontal direction (H direction) in an adjustment menu 33 on the display screen 3D as shown in FIG. 10. The image inverting process in the horizontal direction is performed so that, for example, the input video signal Din as shown in FIG. 11A becomes a video signal D11 as shown in FIG. 11B. In such a manner, proper image inversion is performed on the display screen 3D by the operation from the user according to the use situation of the apparatus (as shown in FIG. 9, the user 5 is able to see the video image in the normal direction). In a manner similar to the case of the use situation shown in FIG. 3, registration adjustment as shown in FIG. 2 and FIGS. 5 to 8 is performed.

In this case, the image inverting process in the horizontal direction is performed. Consequently, when the user 5 tries to perform the registration adjustment by an operation on the display screen 3D, like in a comparative example shown in FIG. 12, since the adjustment direction seen from the user 5 and the actual adjustment direction in the apparatus are opposite to each other in the horizontal direction, it is difficult for the user 5 to perform the registration adjustment. Also in the case where the image inverting process is executed, the direction of the out-of-color-registration caused by misregistration between the primary color lights Lr, Lg, and Lb is unchanged after the image inversion for the reason that the out-of-color-registration occurs in hardware.

Therefore, in the liquid crystal projector 1 of the embodiment, in the case where such an image inverting process is performed as shown in an adjustment menu 34 on the display screen 3E in FIG. 13A, an adjustment value with a sign (in this case, an adjustment value of "−") different from that in the misregistration direction in the coordinate system in the horizontal direction (H direction) before the image inverting process is entered by an operation on the display screen 3E. By the operation, the adjustment direction seen from the user on the display screen 3E and the actual adjustment direction in the apparatus coincide with each other in the horizontal direction as shown in FIG. 13B. Therefore, even in the use situation where the image is inverted in the display screen (in this case, the use situation that the image inversion in the horizontal direction is performed), an adjustment value inputting operation by the user 5 is easy at the time of registration adjustment.

In the embodiment as described above, when misregistration occurs in at least one of the horizontal and vertical directions in the display screen between the primary color lights Lr, Lg, and Lb projected on the screen 17, the video signals D1 for the colors corresponding to the primary color lights Lr, Lg, and Lb are corrected (registration adjustment is performed) so as to reduce the misregistration in accordance with the adjustment value or the like entered an operation on the display screen by the user. Therefore, occurrence of the out-of-color-registration due to the misregistration between the primary color lights Lr, Lg, and Lb is suppressed, and display quality is improved. In addition, the image inverting process is performed on the input video signal Din so that the image inversion is performed in at least one of the horizontal and vertical directions in the display screen on the screen 17. Consequently, the image inversion is performed properly on the display screen by an operation from the user according to the use situation of the apparatus. In the case where such an image inverting process is performed, an adjustment value in a sign different from to that in the misregistration direction in the coordinate system in the horizontal direction (H direction) before the image inverting process is entered by an operation on the display screen. Therefore, even in the use situation such that the image inversion is performed on the display screen, an adjustment value input operation by the user is facilitated. Thus, irrespective of the use situation of the apparatus, the operability in the registration adjustment is improved.

Although the present invention has been described by the embodiment, the invention is not limited to the embodiment but may be variously modified.

Figure 14:
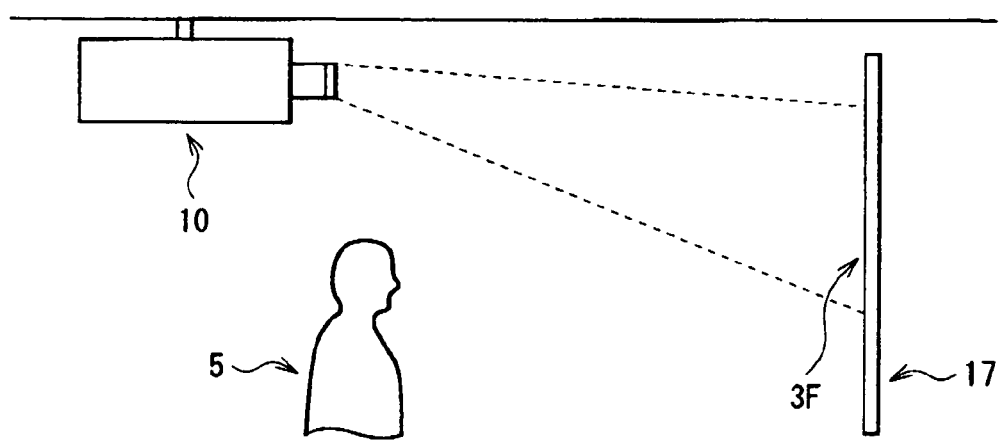
FIG. 14 is a perspective view showing an example of use of a projection display apparatus in the case where image inversion in the vertical direction is necessary.
Figure 15A:
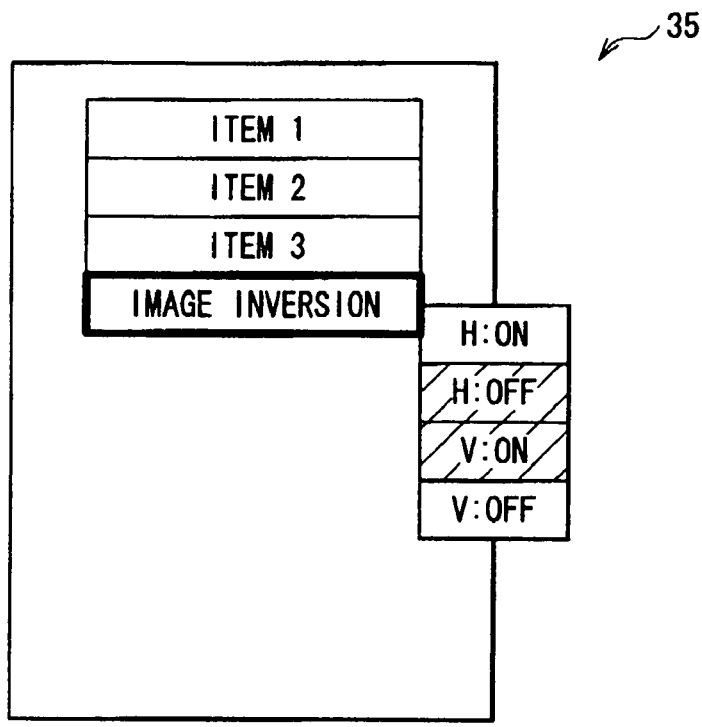
FIGS. 15A to 15C are diagrams showing an example of setting of the image inverting function in the case of FIG. 14 and showing image inversion.
Figure 15B:
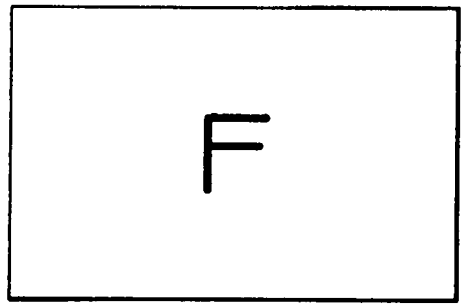
Figure 15C:
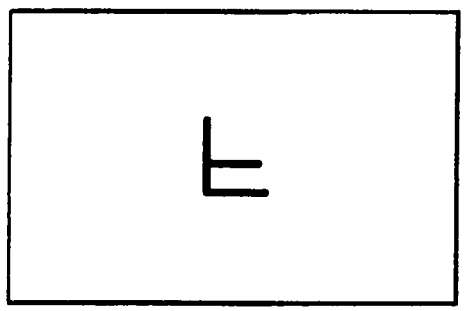
Figure 16A:
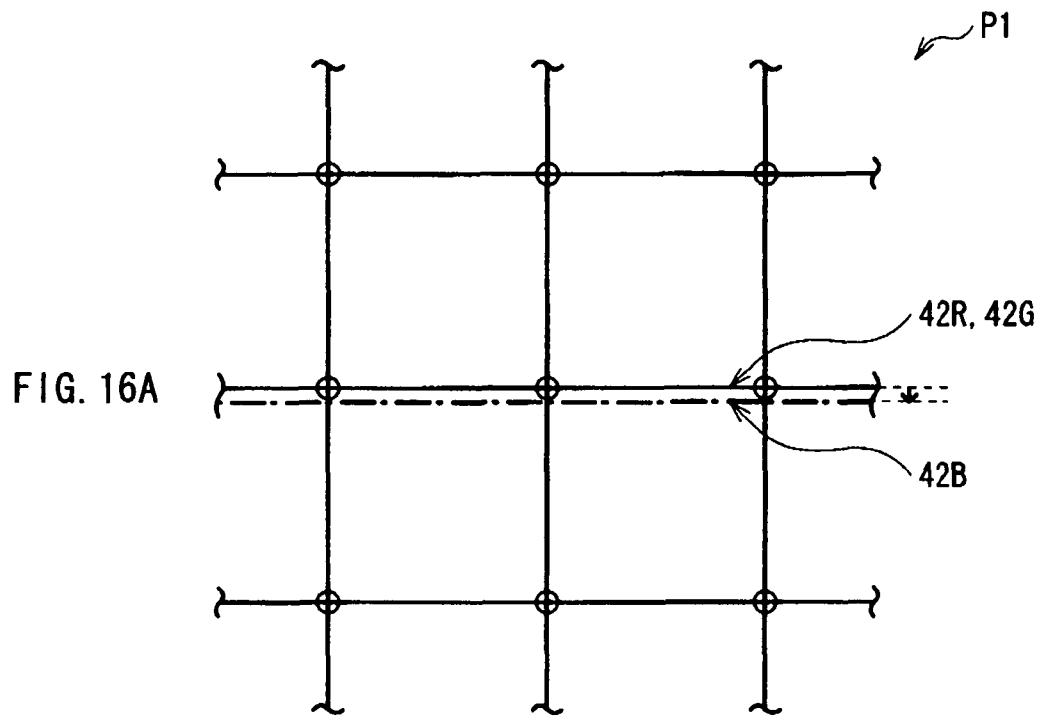
FIGS. 16A and 16B are diagrams for explaining registration adjustment for misregistration in the vertical direction in specific primary color light.
Figure 16B:
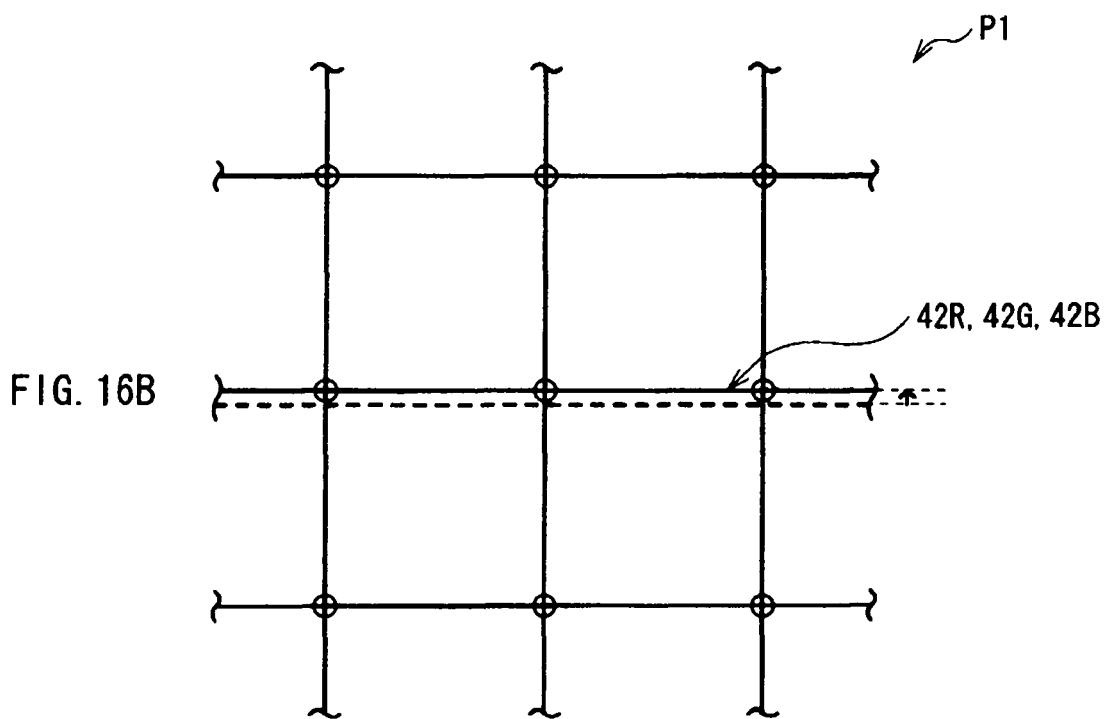
Figure 17A:
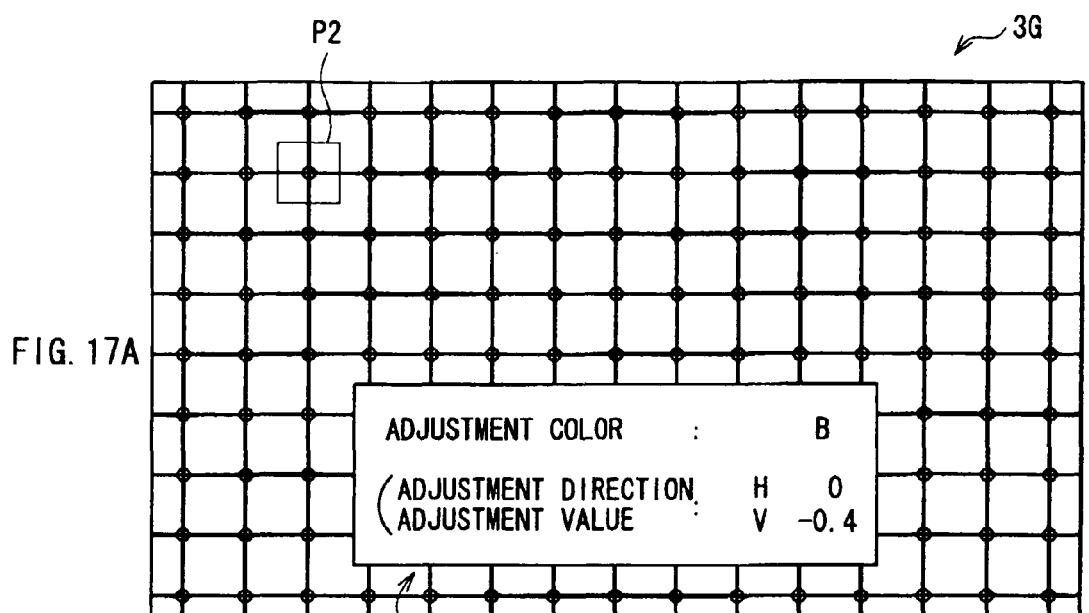
FIG. 17A is a diagram showing an example of the display screen at the time of registration adjustment in the embodiment in the case of FIG. 14.
Figure 17B:
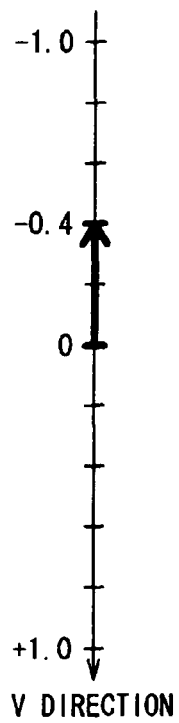
FIG. 17B is a diagram showing an example of thinking of adjustment.

For example, in the foregoing embodiment, the use situation in which the image inverting process in the horizontal direction is necessary as shown in FIG. 9 has been described as an example of the use situation in which the image inverting process is necessary. The present invention is also applicable to a use situation such that the projector body 10 is attached to the ceiling or the like and the user 5 sees a video image (display screen 3F) projected on the screen 17 from the same side as the projector body 10 with respect to the screen 17 as shown in FIG. 14. Concretely, in this case, the user 5 may not see the video image in the normal direction (the video image is inverted in the vertical direction). It is necessary to perform a process of inverting the image in the vertical direction by the video signal processing unit 21. Therefore, in the use situation, the user 5 performs an operation of turning "on" the image inverting function in the vertical direction (V direction) on an adjustment menu 35 on the display screen 3F as shown in FIG. 15A. The image inverting process in the vertical direction is performed so that, for example, the input video signal Din as shown in FIG. 15B becomes a video signal D12 as shown in FIG. 15C. In such a manner, proper image inversion is performed in the display screen 3D by the operation from the user 5 according to the use situation of the apparatus (the user 5 is able to see the video image in the normal direction). If out-of-color-registration in the vertical direction (out-of-color-registration caused by misregistration only by, for example, "−0.4 point (0.4 point in the descent direction)" in the blue light line 42B among the red light line 42R, green light line 42G and blue light line 42B) occurs around reference numeral P1 as shown in FIG. 16A, the user performs an operation using an adjustment menu 36 on a display screen 3G as shown in FIG. 17A to execute the registration adjustment in a manner similar to the foregoing embodiment. The out-of-color-registration caused by misregistration may be reduced (eliminated) as shown in FIG. 16B. In this case as well, as shown in an adjustment menu 36 in FIG. 17A, an adjustment value with a sign different from that in the misregistration direction in the coordinate system in the vertical direction (V direction) before the image inverting process is entered by an operation on the display screen 3G. By the operation, the adjustment direction seen from the user on the display screen 3G and the actual adjustment direction in the apparatus coincide with each other in the vertical direction. Therefore, even in the use situation where the image is inverted in the display screen (in this case, the use situation that the image inversion in the vertical direction is performed), an adjustment value inputting operation by the user 5 is easy at the time of registration adjustment.

Figure 18:
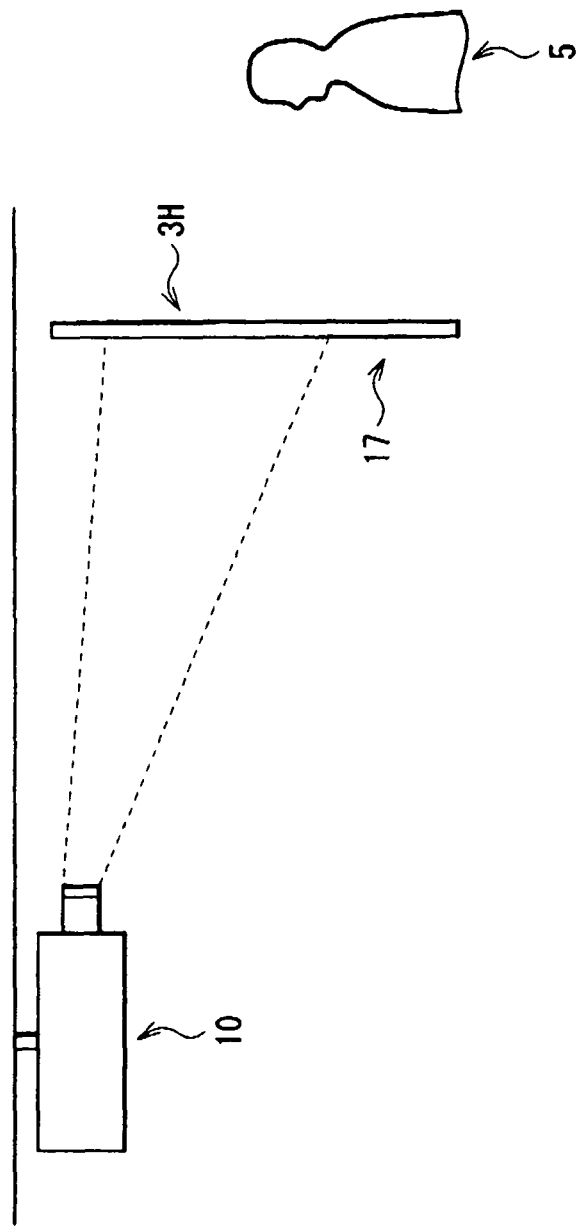
FIG. 18 is a perspective view showing an example of use of the projection display apparatus in the case where the image inversion in the horizontal and vertical directions is necessary.
Figure 19A:
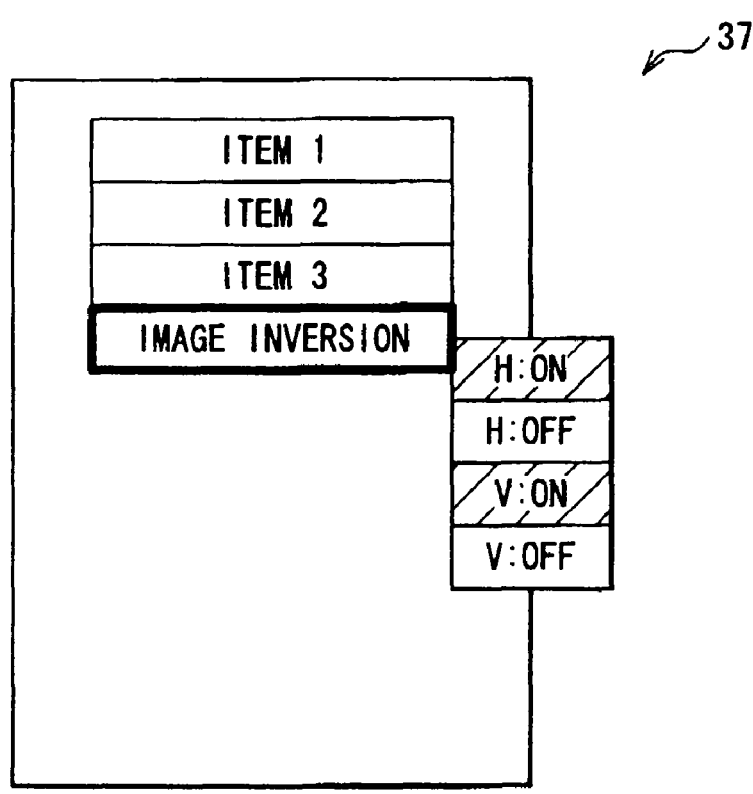
FIGS. 19A to 19C are diagrams for explaining an example of setting of the image inverting function in the case of FIG. 18 and showing image inversion.
Figure 19B:
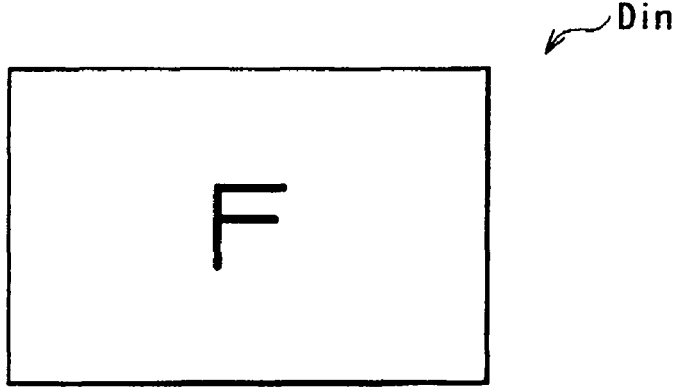
Figure 19C:
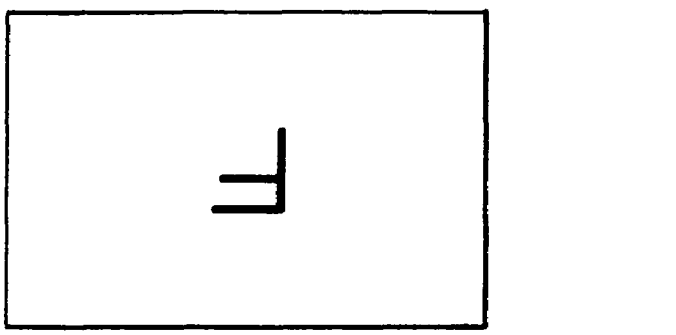
Figure 20A:
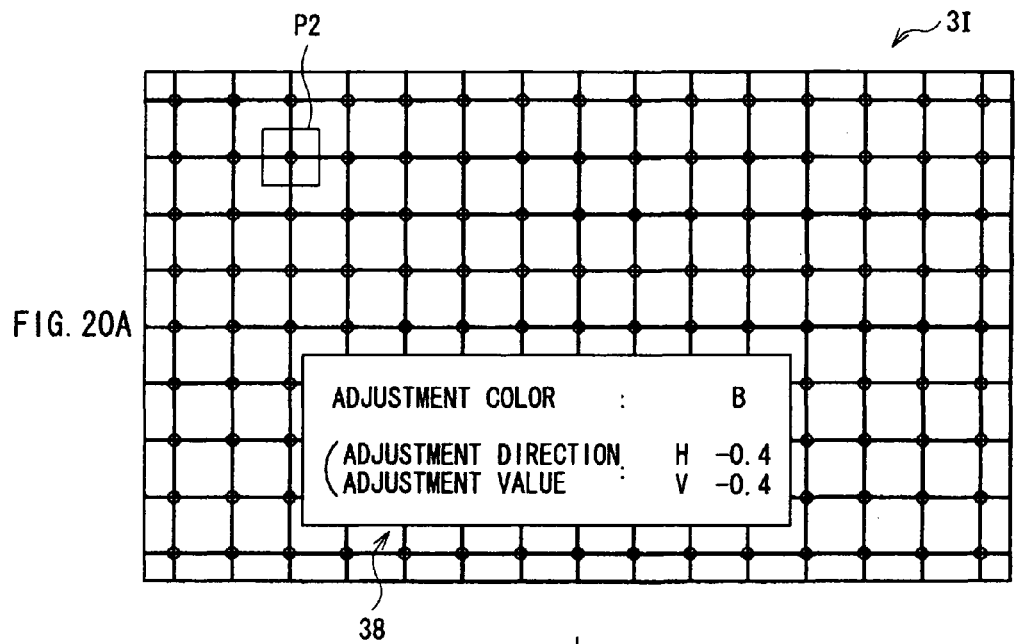
FIG. 20A is a diagram showing an example of a display screen at the time of performing registration adjustment in the embodiment in the case of FIG. 18.
Figure 20B:
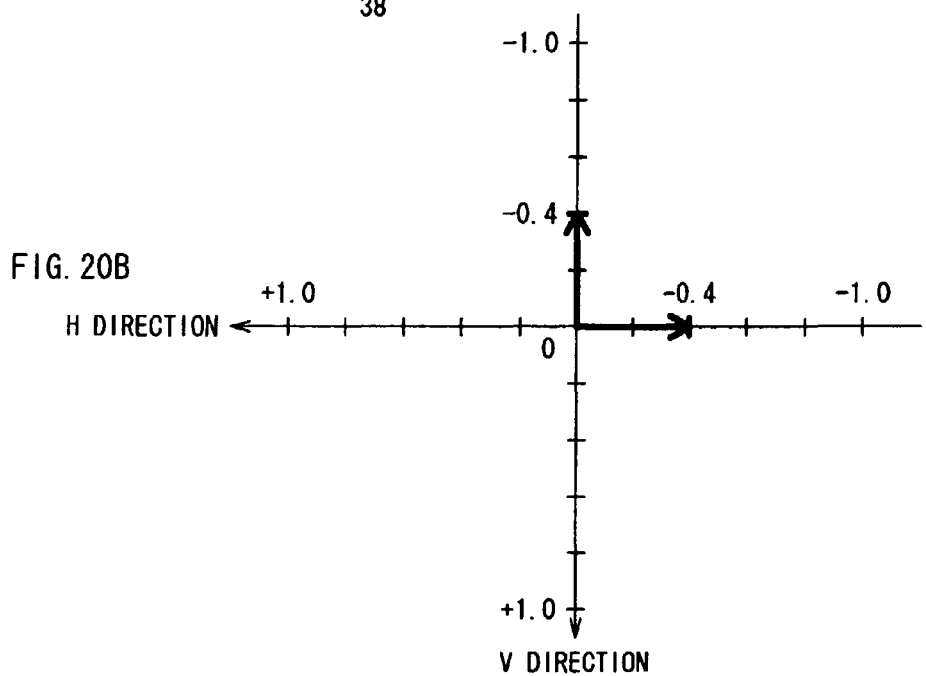
FIG. 20B is a diagram showing an example of thinking of adjustment.

The present invention is also applicable to a use situation such that, as shown in FIG. 18, the projector body 10 is attached to the ceiling or the like and the user 5 sees a video image (display screen 3H) projected on the screen 17 from the opposite side of the projector body 10 with respect to the screen 17. Concretely, in this case, the user 5 may not see the video image in the normal direction (the video image is inverted in the horizontal and vertical directions). It is necessary to perform a process of inverting the image in the horizontal and vertical directions by the video signal processing unit 21. Therefore, in the use situation, the user 5 performs an operation of turning "on" the image inverting function in the horizontal direction (H direction) and the vertical direction (V direction) on an adjustment menu 37 on the display screen 3H as shown in FIG. 19A. The image inverting process in the horizontal and vertical directions is performed so that, for example, the input video signal Din as shown in FIG. 19B becomes a video signal D13 as shown in FIG. 19C. In such a manner, proper image inversion is performed in the display screen 3H by the operation from the user 5 according to the use situation of the apparatus (the user 5 is able to see the video image in the normal direction). If out-of-color-registration in the horizontal and vertical directions occurs in the display screen 3H, the user performs an operation using an adjustment menu 38 on a display screen 3I as shown in FIG. 20A to execute the registration adjustment in a manner similar to the foregoing embodiment. As a result, the out-of-color-registration caused by misregistration is reduced (eliminated). In this case as well, as shown in the adjustment menu 38 in FIG. 20A, an adjustment value with a sign different from that in the misregistration direction in the coordinate system in the horizontal and vertical directions before the image inverting process is entered by an operation on the display screen 3I. By the operation, the adjustment direction seen from the user on the display screen 3I and the actual adjustment direction in the apparatus coincide with each other in both of the horizontal direction and the vertical direction. Therefore, even in the use situation where the image is inverted in the display screen (in this case, the use situation that the image inversion in the horizontal and vertical directions is performed), the adjustment value inputting operation by the user 5 is easy at the time of registration adjustment.

In the foregoing embodiment, the case of performing the registration adjustment in order to reduce (eliminate) the misregistration in the "−" direction has been described. On the contrary, registration adjustment for reducing (eliminating) the misregistration in the "+" direction may be performed in a manner similar to the embodiment, and similar effects may be obtained.

In the foregoing embodiment, the case of selecting a color to be adjusted by the user at the time of registration adjustment and, after that, selecting a position to be adjusted (adjustment point) as shown in FIG. 2 has been described. For example, in the opposite order, it is also possible to select a position to be adjusted (adjustment point) and, then, select a color to be adjusted.

Although the so-called 3-modulation-panel projection display apparatus (projector) has been described in the embodiment, the type of the projection display apparatus is not limited to the above. The invention is also applicable to projection display apparatuses of other types as long as there is the possibility that misregistration occurs between primary color lights projected on a screen. Further, in the embodiment, the case where the spatial light modulation devices are liquid crystal elements (the liquid crystal elements 14R, 14G, and 14B) and are configured as a liquid crystal apparatus (liquid crystal projector 1) has been described. As another spatial light modulation device, for example, a DMD (Digital Micromirror Device) may be used.

Obviously many modifications and variations of the present invention are possible in the light of the above teachings. It is therefore to be understood that within the scope of the appended claims the invention may be practiced otherwise than as specifically described.

What is claimed is:

1. A projection display apparatus comprising:
a light source;
a spatial light modulation device modulating, on the basis of a video signal, each of primary color lights for color display emitted from the light source;
projecting means for projecting, onto a screen, each of the primary color lights modulated by the spatial light modulation device;
means for enabling a user to select an image inverting process to be performed in any one of (i) a horizontal only direction, (ii) a vertical only direction, and (iii) the horizontal direction and the vertical direction;
signal processing means for performing the image inverting process selected by the user on the video signals so that an image projected on the screen is inverted in the selected one of the horizontal only direction, the vertical only direction, or the horizontal direction and the vertical direction on the screen; and correcting means for correcting, based on a correction value entered by an operation on the screen, the video signal for each of the primary color lights so as to reduce misregistration between the primary color lights projected on the screen, and supplying the corrected video signal to the spatial light modulation device, wherein when the image projected on the screen is inverted, the correction value with a sign is entered by an operation on the screen, the sign being different from that of misregistration direction under a coordinate system where the image is not inverted.

2. The projection display apparatus according to claim 1, wherein the spatial light modulation device includes liquid crystal elements, and the projection display apparatus is configured as a liquid crystal projector.

3. A projection display apparatus comprising:

a light source;

a spatial light modulation device modulating, on the basis of a video signal, each of primary color lights for color display emitted from the light source;

projecting section projecting, onto a screen, each of the primary color lights modulated by the spatial light modulation device;

image inverting selecting device which enables a user to select an image inverting process to be performed in any one of (i) a horizontal only direction, (ii) a vertical only direction, and (iii) the horizontal direction and the vertical direction;

signal processing section performing the image inverting process on the video signals so that an image projected on the screen is inverted in the selected one of the horizontal only direction, the vertical only direction, or the horizontal direction and the vertical direction on the screen; and correcting section correcting, based on a correction value entered by an operation on the screen, the video signal for each of the primary color lights so as to reduce misregistration between the primary color lights projected on the screen, and supplying the corrected video signal to the spatial light modulation device, wherein when the image projected on the screen is inverted, the correction value with a sign is entered by an operation on the screen, the sign being different from that of misregistration direction under a coordinate system where the image is not inverted.

* * * * *